United States Patent [19]

Widmer et al.

[11] Patent Number: 4,748,083
[45] Date of Patent: May 31, 1988

[54] MOISTURE CURABLE COMPOSITION

[75] Inventors: Jürg Widmer, Zürich; Gerhard Leu, Neuhausen a. Rheinfall; Ueli Sulser, Oberengstringen, all of Switzerland

[73] Assignee: Sika AG, Vorm. Kaspar Winkler & Co., Zurich, Switzerland

[21] Appl. No.: 3,617

[22] Filed: Jan. 15, 1987

[30] Foreign Application Priority Data

Jan. 29, 1986 [CH] Switzerland .......................... 341/86

[51] Int. Cl.$^4$ ....................... C08G 75/08; C08G 75/00
[52] U.S. Cl. ..................................... 428/419; 525/523; 528/99; 528/150; 528/363; 528/377; 549/1; 549/90
[58] Field of Search ................. 528/99, 150, 363, 377; 525/523; 549/1, 90; 428/419

[56] References Cited

U.S. PATENT DOCUMENTS

| | | | |
|---|---|---|---|
| 3,026,285 | 3/1962 | Hirosawa | 260/45.2 |
| 3,071,593 | 1/1963 | Warner | 528/377 X |
| 3,275,655 | 9/1966 | Monroe | 549/90 |
| 3,291,775 | 12/1966 | Holm | 528/407 X |
| 3,337,606 | 8/1967 | Floyd | 528/123 X |
| 3,378,522 | 4/1968 | Martin | 260/47 |

FOREIGN PATENT DOCUMENTS

| | | |
|---|---|---|
| 594713 | 2/1974 | Switzerland . |
| 598297 | 2/1974 | Switzerland . |
| 905725 | 9/1962 | United Kingdom . |

*Primary Examiner*—Earl Nielsen
*Attorney, Agent, or Firm*—Burns, Doane, Swecker & Mathis

[57] ABSTRACT

A moisture curable composition contains:
(a) one or more episulfide compounds having on the average more than one 1,2-epithiopropyl ether group of the formula I

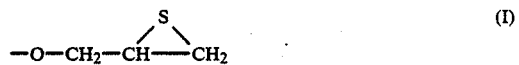

per molecule, and
(b) one or more aliphatic N,N'-dialkyl-substituted diketimines of the general formula II

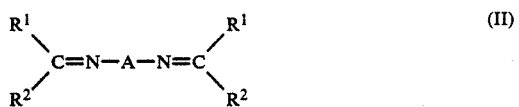

wherein
A is a divalent aliphatic, cycloaliphatic or arylaliphatic group, and
$R^1$ and $R^2$ are each an alkyl group, or form together with the C-atom, to which they are bonded, a cycloalkyl group or cycloalkenyl group, and
(c) at least one component, selected from the group of the setting accelerators as well as commercially available solvents, reactive diluents, plasticizers, thixotropic aids, fillers and pigments.

This composition may be used as lacquers, paints and coatings for steel and concrete.

There is also described a process for the preparation of 1,2-epithiopropyl ethers.

17 Claims, No Drawings

MOISTURE CURABLE COMPOSITION

BACKGROUND OF THE INVENTION

1. Field of the Invention

This invention is directed to a composition which hardens under the influence of moisture at ambient temperature, and consists of one or more polyvalent episulfide compounds, one or more disubstituted diketimines and occasionally one setting accelerator as well as in the lacquer, paints and coating industry usual additives, thixotropic aids, solvents and fillers.

Cold-hardenable compositions of mixtures of polyglycidyl ethers, which are denoted in commerce as epoxide resins, and polyamines have been used for a long time in the construction industry and in the corrosion protection as paints, spray lacquers and spray coatings as well as for impregnations.

2. Description of the Prior Art

Compositions of epoxide resins and disubstituted diketimines may be used for the above purposes, which will harden under the influence of moisture, and are described, e.g., in U.S. Pat. No. 3,026,285 and in G. B. Pat. No. 905 725.

The processing time of epoxide resin/diketimine mixtures is in general several hours, which, compared with "normal" epoxide resin/polyamine mixtures, having only short processing times of in general below 30 minutes, is an advantage when they are processed with a simple one component-spraying device.

The curing time of these epoxide resin/diketimine mixtures, i.e. the time which is necessary for the complete development of the use characteristics, is in general, at a temperature from 20° to 25° C. from one to several days. At temperatures below 8° C. the curing reaction is so slow that these mixtures may no longer be used. However, one can add compounds which will accelerate the curing reaction. A disadvantage with such accelerating compounds, such as phenols, alcohols, or organic acids, is that those which are not used during curing have a detrimental influence on the use characteristics of the cured resins, e.g. the mechanical strengths, the resistance against solvents, water and chemicals, as well as the resistance against the influence of heat.

SUMMARY OF THE INVENTION

Hence, it is a general object of the present invention to provide a moisture hardenable composition, which has, with an extremely rapid cure a processing time of several hours and which hardens completely at ambient temperatures from 0° to 8° C.

The cured composition should additionally have the known good mechanical and chemical characteristics of polyamine-hardened epoxide resins, The inventive object is realized by the use of disubstituted diketimines and episulfide compounds, having on the average more than one 1,2-epithiopropylene ether group, described below as episulfide resins, as reactive components in the inventive composition.

The moisture hardenable composition contains:

(a) one or more episulfide compounds having on the average more than one 1,2-epithiopropyl ether group of the formula I

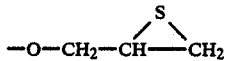

per molecule, and (b) one or more aliphatic N,N'-dialkyl-substituted diketimines of the general formula II

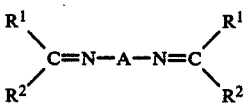

wherein

A is a divalent aliphatic, cycloaliphatic or arylaliphatic group, and $R^1$ and $R^2$ are each an alkyl group, or form together with the C-atom, to which they are bonded, a cycloalkyl group or cycloalkenyl group, and (c) at least one component, selected from the group of the setting accelerators as well as commercial available solvents, reactive diluents, plasticizers, thixotropic aids, fillers and pigments.

DESCRIPTION OF THE PREFERRED EMBODIMENTS

Preferred embodiments of this composition are described in the dependent claims.

It is known that episulfide resins react extremely quickly with nucleophilic substances, i.e. with substances having at one of their atoms a free, basic electron pair, especially with polyamines. This reactivity may be used for the base-catalyzed preparation of linear polymers of episulfide resins, and is discussed e.g. by R. W. Martin in the U.S. Pat. No. 3,378,522.

Leu et al. describe in CH-PS No. 598 297 and CH-PS No. 594 713 the extremely quick hardening of episulfide resin/polyamine-mixtures and the use of such mixtures.

Now it was found quite surprisingly that episulfide resins of the general formula V

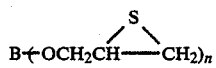

despite their electrophilic epithio groups react extremely slowly with N,N'-disubstituted diketimines of the general formula II

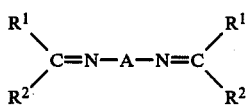

wherein B is an n-valent aromatic, cycloaliphatic, aliphatic or arylaliphatic group, n is at least 1, A is a divalent aliphatic, cycloaliphatic or arylaliphatic group, and $R^1$ and $R^2$ are each an alkyl group, or form together with the C-atom, to which they are bonded, a cycloalkyl group or a cycloalkenyl group.

Additionally, the composition can contain setting accelerators as well as commercially, available solvents, reactive diluents, plasticizers, thixotropic acids, fillers and pigments.

The episulfide component is preferably an 1,2-epithiopropyl ether of a polyvalent phenol, preferably a bisphenol A derivable epithiopropyl ether of a general formula III

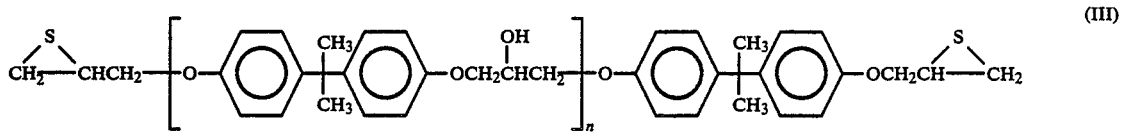

wherein
n=—50, preferably 0–20, especially 0–10, or a bisphenol F derivable epithiopropyl ether of the general formula IV

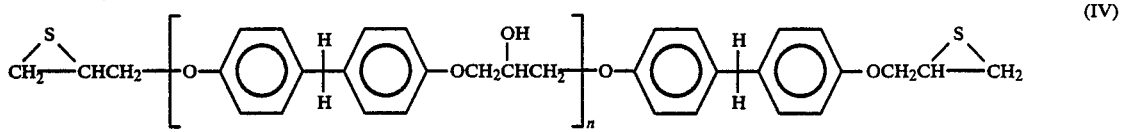

wherein
n=0–50, preferably 0–20, especially 0–10, or a mixture of the compounds III and IV in any weight ratio.

The 1,2-epithiopropyl ether compound can include besides the compounds III and IV, additionally up to 50 percent by weight of at least one polyvalent epithiopropyl ether, which is derived from a polyvalent alcohol, selected from the group consisting of glycerine, 1,4-butandiol, neopentylglycol, hexandiols, isomeric cyclohexan-dimethanols, ethylenglycol and diethyleneglycol.

Preferably the diketimine is one of the following formulas:

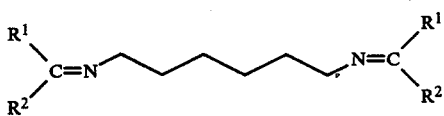

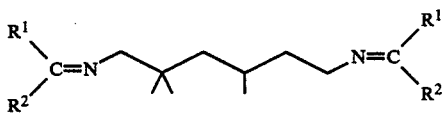

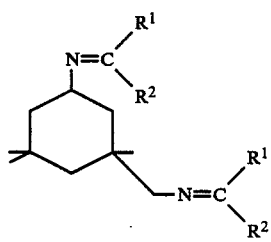

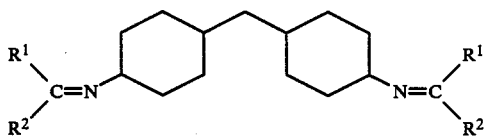

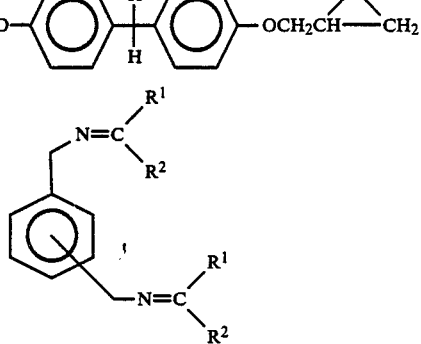

whereby in the above formulas
$R^1$ and $R^2$ are each a methyl, ethyl, isopropyl, or isobutyl group, or form together with the C-atom, to which they are bonded, a cyclohexane ring or a 3,5,5-trimethylcyclohex-2-ene-ring, or
is derived from a polyamide having two terminal primary amino groups, which have an amine number in the range from 80 to 320 mg KOH per gram of the polyamide.

The episulfide and diketimines are preferably present in stoichiometric mixing proportions.

Among the possible setting accelerators are the commercial available tertiary amine, preferably 1,4-diazabicyclo[2.2.2]octane or tetramethylguanidine or dimethylaminobenzylamine or 2,4,6-tris-(dimethylaminomethyl)phenol. When a setting accelerator is employed, it is preferably contained in an amount from 0.05 to 20 percent by weight, relative to the weight of the episulfide and the diketimine.

Furthermore, these mixtures show over several hours no marked increase in viscosity. Therefor these inventive compositions show a long processing time, and may be applied with the aid of a simple 1-component-spraying device. The quick curing reaction begins only when the diketimine is hydrolyzed by moisture, added during the spraying step, and thereby the diamine of the formula IX, which is necessary for the curing, is liberated (see Scheme 1)

Scheme 1: Hydrolysis of a diketimine

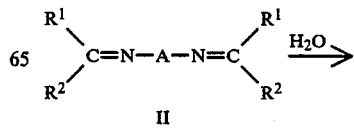

II

-continued

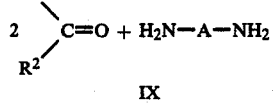

(IX)

The preparation of the episulfide resins, contained in the inventive composition, is generally known and is described, e.g., by R. W. Martin in U.S. Pat. No. 3,378,522. But this is a very complicated process having reaction times between 20 and 40 hours where the reaction mixture must always be kept at a temperature of 0° C.

Quite surprisingly there is now found a process for the preparation of 1,2-epithiopropyl ethers of the formula V

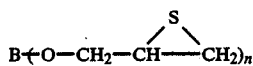  (V)

wherein
B is an n-valent, aromatic, cycloaliphatic, aliphatic or arylaliphatic group, and
n is the numbers 2 to 4,
which is characterized in that a glycidyl ether of the formula VI

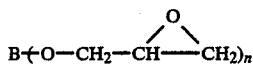  (VI)

wherein B and n are defined above,
or a mixture of glycidyl ethers of the above formula VI, is reacted under reflux with thiourea in the presence of acetone or in the presence of a solvent mixture, containing dichloromethane and up to 50 percent by weight of a low-molecular alcohol, preferably methanol, ethanol, propanol or isopropanol.

The thiourea is preferably reacted in a ratio from 0.5 to 1 mol per mol of the epoxide groups to be reacted.

The digylcidyl ether is preferably of the bisphenol A type of the general formula VII $n=0-50$, preferably 0–20, especially 0–10, preferably a mixture of the diglycidyl ether of the formulas VII and VIII, is reacted.

The glycidyl ether of the formula VII is preferably selected from the group consisting of the triglycidyl ether of glycerine, 1,4-butandioldiglycidyl ether, neopentylglycoldiglycidyl ether, hexandiol-di-glycidyl ether, the diglycidyl ethers of isomeric cyclohexandimethanols, ethylenglycoldiglycidyl ether and diethylenglycol-diglycidyl ether.

Preferred embodiments of this inventive process are described in the dependent claims.

In all formulas all residues and groups may occasionally be substituted.

The following examples shall illustrate the invention.

EXAMPLES

General Remarks

For the preparation of the episulfide resins, described in the following examples 1 to 3, the following diglycidyl ethers (epoxide resins) were used:

| Diglycidyl ether | Type | Epoxide number ($E_o$) |
|---|---|---|
| A | Bisphenol A | 0.1–0.57 |
| F | Bisphenol F | 0.1–0.57 |
| N | Neopentylglycol-diglycidyl ether | 0.60–0.70 |

The epoxide number is the number of mols of epoxide oxygen contained in 100 g epoxide resin.

The epoxide number $E_o$ may be determined by titration, e.g. according to B. Dobinson, W. Hofmann, B. Stark, "The Determination of Epoxide Groups", page 55, Pergamon Press 1969.

The episulfide number $E_s$ (mol episulfide sulfur per 100 g episulfide resin) may be calculated from NMR-spectroscopic data and sulfur elemental analysis.

In example 4 there is described the preparation of a diketimine by reacting isobutyl-methyl ketone and 3-aminomethyl-3,5,5-cyclohexylamine (IPD) having an active H-equivalent of $a_H = 85.2$. The active H-equivalent of an amine hardener is defined as

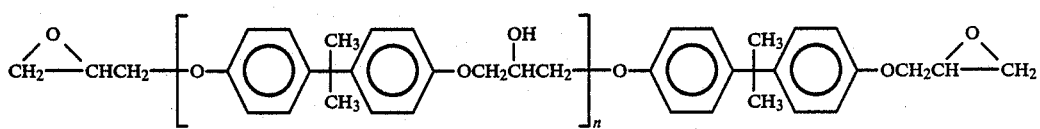  (VII)

wherein
$n=0-50$, preferably 0–20, especially 0–10, or
a diglycidyl ether of bisphenol F of the general formula VIII $$a_H = \frac{\text{mol weight of the amine}}{\text{number of active H-atoms}}$$

In the case of a diketimine a potential active H-equivalent may be defined as follows:

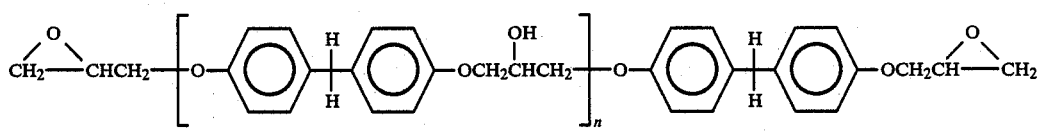  (VIII)

wherein $$(\alpha_H)\text{pot} = \frac{\text{mol weight of the ketimine}}{Z_H}$$

EXAMPLE 2

Preparation of a mixture of episulfide resins of the general formulas III and IV

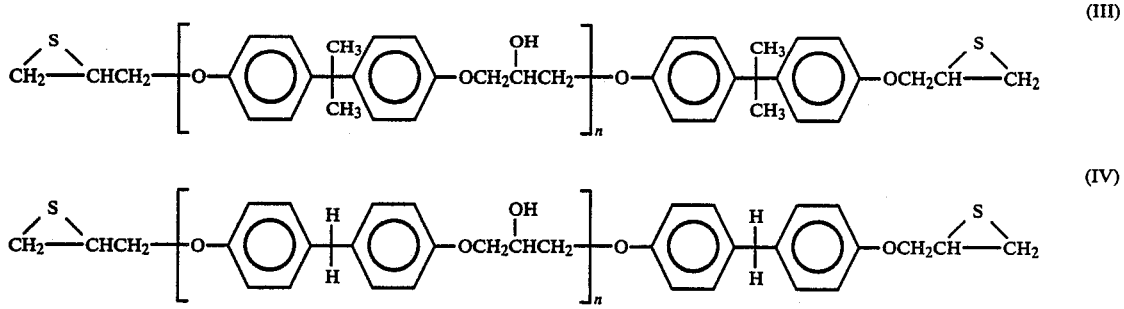

whereby $Z_H$=number of the potential hydrolysis formed active H-atoms, at nitrogen.

The stoichiometric mixing ratio of ketimine to episulfide resin is calculated by:

$(\alpha_H)_{por}\cdot E_s$ [Weight parts ketimine per 100 weight parts episulfide resin]

EXAMPLE 1

Preparation of an episulfide resin of the bisphenol-A-type of the general formula III

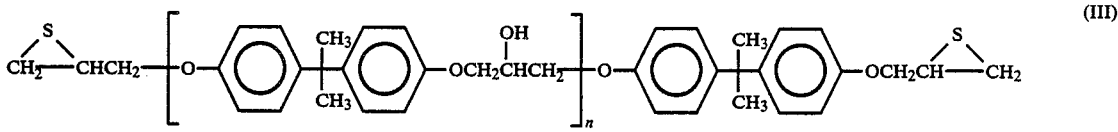

In a three-necked flask, equipped with a reflux condenser, a thermometer and a KPG-stirrer, a mixture, consisting of 300 g epoxide resin of the bisphenol-A-type ($E_o$=0.55), 125 g thiourea (1.65 mol), 300 ml dichloromethane and 60 ml ethanol, was heated during 5 hours under reflux (45° C.) and by stirring.

Then there was added, quickly under vigorous stirring, 300 ml tap water (18° C.). This was stirred over 5 minutes, whereby the temperature fell to 30° C. The complete reaction mixture was then transferred, with the organic phase, in a separating funnel, whereby within a few minutes a clear separation of the phases occurred. The organic phase was separated and extracted once with 300 ml water, then there was added, for drying purposes 15 g water-free sodium sulfate and the resulting mixture was stirred so long until the upper solution no longer showed any cloudiness. After filtration and evaporation of the solvent, 305 g of a nearly colorless episulfide resin was obtained, which was characterized as follows:

NMR (CDCl$_3$): 2.31 ppm (Doublet, 1H), 2.47 ppm (Doublet, 1H), 5.22 ppm (Singlet, 2H, CH$_2$Cl$_2$).

Viscosity (25° C.): 25 000 mPa.s.

$E_o$=0.08; $E_s$=0.42 Mol/100 g.

Density (g/ml/25°): 1.15±0.05.

The resin began to crystallize after a 2 days standing at room temperature.

In a three-necked flask equipped with a KPG-stirrer, a thermometer and a reflux condenser there was mixed 127 g (1.65 mol) thiourea, 90 g diglycidyl ether F ($E_o$=0.56), 210 g diglycidyl ether A ($E_o$=0.55), 300 ml dichloromethane and 60 ml ethanol and heated under reflux during 5 hours at a temperature of 45° C. by stirring. Then there was added, under vigorous stirring, 300 ml water (18° C.). According to the process described in example 1 there were obtained 300 g of a slightly yellowish episulfide resin having the following characteristics:

Viscosity (25° C.): 17 000 mPa.s.

$E_o$=0.04; $E_s$=0.46 mol/100 g.

Density (g/ml/25° C.): 1.16±0.05.

NMR (CDCl$_3$): 2.30 ppm (Doublet, 1H), 2.48 ppm (Doublet, 1H).

The resin showed no crystallization after several months of storage (22°-25° C.).

EXAMPLE 3

Preparation of a noncrystallizable episulfide resin mixture with low viscosity.

According to the preparation prescriptions described in examples 1 and 2 there was reacted a mixture consisting of 72 g diglycidyl ether F, 168 g diglycidyl ether A and 60 g diglycidyl ether N ($E_o$=0.70), with 130 g (1.7 mol) thiourea. The reaction product is described below.

There were obtained 300 g of a slightly yellow episulfide resin.

Viscosity (25° C.): 8 000 mPa.s.

$E_o$=0.03; $E_s$=0.49 mol/100 g.

Density (g/ml/25° C.): 1.14±0.05.

EXAMPLE 4

Prepration of a diketimine hardener by the reaction of IPD with isobutyl-methyl ketone.

In a three-necked flask, equipped with a water separator and a KPG-stirrer, there was placed 120 g (0.71 mol) IPD, 150 g toluene and 0.9 g p-toluene sulfonic acid, and then there was added, quickly under stirring, 169.5 g (1.69 mol) isobutylmethyl ketone. Then the solution was heated to 100° C., whereby the water began to slowly separate. The temperature was then slowly raised to 115° C. When the calculated amount (30 g) of water had separated, the toluene and the excess ketone were distilled with the aid of a water jet pump on a rotation evaporator.

There was obtained 240 g of an easily movable yellow oil.

The gas chromatographical analysis of the oil gave the following composition:

| Isobutyl-methyl ketone | 11.5% |
|---|---|
| Monoketimine | 2% |
| Diketimine | 85.5% |
| Unknown | 1% |

$(\alpha_H)_{pot} = 95.4$

EXAMPLE 5

A moisture quick hardenable, solvent containing, two component-spray-lacquer (clear lacquer) may be prepared according to the following prescriptions:

| | Parts by weight |
|---|---|
| (A) Resin component | |
| episulfide resin according to example 2 | 85 |
| dichloromethane | 15 |
| | 100 |
| (B) Curing component | |
| diketimine according to example 4 | 47.7 |
| 4,4'-diazabicyclo[2.2.2]octane | 2.3 |
| isobutylmethyl ketone | 29 |
| Formic acid | 1 |
| | 79.0 |

By a mixing of the components (A) and (B) there was obtained a clear lacquer having the following characteristics and which is applicable with the usual spray equipment:

| pot storage time (25° C.): | 4 hours |
|---|---|
| time to dry such that dust will not cling (0° C.): | 15 minutes |
| time to dry such that dust will not cling (25° C.): | 5 minutes |
| time after which the mixture will no longer be tacky (25° C.): | 10 minutes after application |
| time after which the mixture will no longer be tacky (0° C.): | 30 minutes after application |
| time for loadability with water or mechanical loadability: | 1 hour after application |
| final hardness (25° C.): | reached after 90 minutes |
| pendulum hardness according to Konig | |
| 50 μ layer thickness | 130 seconds |
| 100 μ layer thickness | 125 seconds |

EXAMPLE 6

A moisture quick hardenable, solvent-poor, two-components-spray coating according to the following prescriptions:

| | Parts by weight |
|---|---|
| (A) Resin component | |
| episulfide resin according to example 2 | 56 |
| ethylglycolacetate | 4 |

-continued

| | Parts by weight |
|---|---|
| dichloromethane | 5 |
| pyrogen silicic acid | 10 |
| TiO$_2$ | 7 |
| ferric oxide black | 0.5 |
| Blanc Baryt | 17.5 |
| | 100 |
| (B) Curing component | |
| diketimine according to example 4 | 26 |
| 4,4'-diazobicyclo[2.2.2]octane | 2 |
| formic acid water-free | 5 |
| isobutyl-methyl ketone | 5 |
| | 38 |

By mixing of the components (A) and (B) there is obtained a coating which is processable with the usual airless spraying devices and has the following characteristics:

| pot storage time (25° C.) | 6 hours |
|---|---|
| time to dry such that dust will not cling (0° C.): | 15 minutes |
| time to dry such that dust will not cling (25° C.): | 5 minutes |
| time after which the mixture will no longer be tacky (0° C.): | after 25 minutes |
| time after which the mixture will no longer be tacky (25° C.): | after 10 minutes |
| time for loadability with water or mechanical loadability: | 1 hour after application |
| final hardness (25° C.): | reached after 120 minutes |
| pendulum hardness according to Konig | |
| 100μ layer thickness | 140 seconds |
| 200μ layer thickness | 140 seconds |

We claim:
1. A moisture hardenable composition containing
(a) one or more episulfide compounds having on the average more than one 1,2-epithiopropyl ether group of the formula I

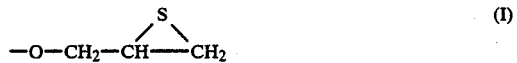

per molecule, and
(b) one or more aliphatic N,N'-dialkyl-substituted diketimines of the general formula II

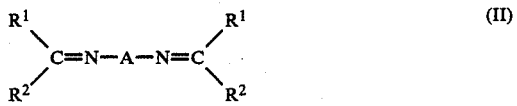

wherein
A is a divalent aliphatic, cycloaliphatic or arylaliphatic group, and
R$^1$ and R$^2$ are each an alkyl group, or form together with the C-atom, to which they are bonded, a cycloalkyl group or cycloalkenyl group, and
(c) at least one component, selected from the group of the setting accelerators as well as commercially available solvents, reactive diluents, plasticizers, thixotropic aids, fillers and pigments.
2. The composition according to claim 1, wherein the episulfide component according to (a) is an 1,2-epithiopropyl ether of a polyvalent phenol.

3. The composition according to claim 1, characterized in that the component according to (a) contains, besides the compounds III and IV, additionally up to 50 percent by weight of at least one polyvalent epithiopropyl ether, which is derived from a polyvalent alcohol, selected from the group consisting of glycerine, 1,4-butandiol, neopentylglycol, hexandiols, isomeric cyclohexan-dimethanols, ethylenglycol and diethyleneglycol.

4. The composition according to claim 1, characterized in that the diketimine component according to (b) has one of the following formulas:

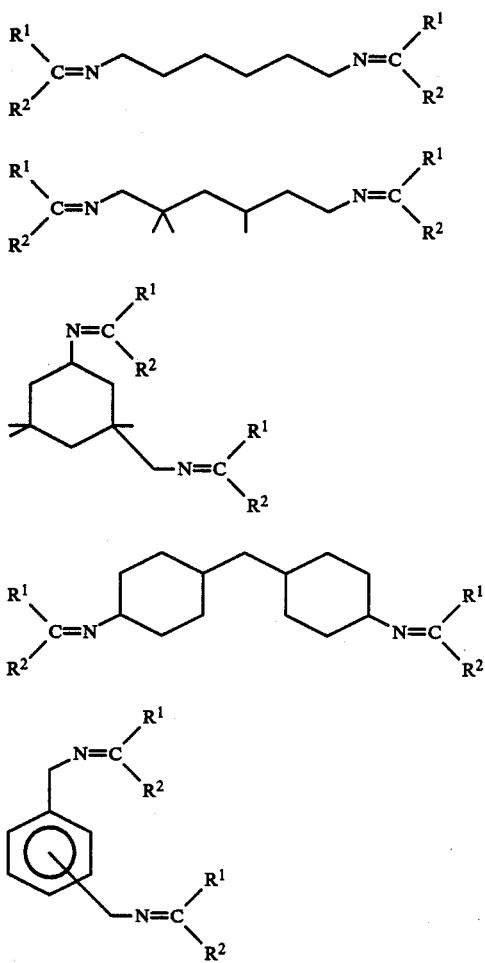

whereby in the above formulas $R^1$ and $R^2$ are each a methyl, ethyl, isopropyl, or isobutyl group, or form together with the C-atom, to which they are bonded, a cyclohexane ring or a 3,5,5-trimethyl-cyclohex-2-ene-ring, or is derived from a polyamide having two terminal primary amino groups, which have an amine number in the range from 80 to 320 mg KOH per gram of the polyamide.

5. The composition according to claim 1, characterized in that the setting accelerator according to (c) is a commercial available tertiary amine, preferably 1,4-diazabicyclo[2.2.2]octane or tetramethylguanidine or dimethylaminobenzylamine or 2,4,6-tris-(dimethylaminomethyl)phenol.

6. The composition according to claim 1, characterized in that the components according to (a) and (b) with respect to their epithio groups and potential amino groups are present in a stoichiometric mixing proportion.

7. The composition according to claim 1, characterized in that the setting accelerator according to (c) is contained in an amount from 0.05 to 20 percent by weight, relative to the weight of the components (a) and (b).

8. A process for the preparation of 1,2-epithiopropyl ethers of the formula V

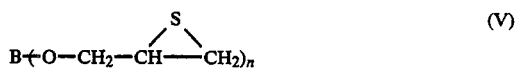

wherein

B is an n-valent, aromatic, cycloaliphatic, aliphatic or arylaliphatic group, and n is a number from 2 to 4, characterized in that a glycidyl ether of the formula VI

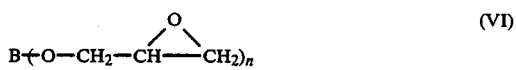

wheren B and n are defined above, or a mixture of glycidyl ethers of the above formula VI is reacted under reflux with thiourea in the presence of acetone or in the presence of a solvent mixture, containing dichloromethane and up to 50 percent by weight of a low-molecular weight alcohol, preferably methanol, ethanol, propanol or isopropanol.

9. The process according to claim 8, characterized in that the thiourea is reacted in a ratio from 0.5 to 1 mol per mol of the epoxide groups to be reacted.

10. The process according to claim 8, characterized in that a diglycidyl ether of the bisphenol A of the general formula VII

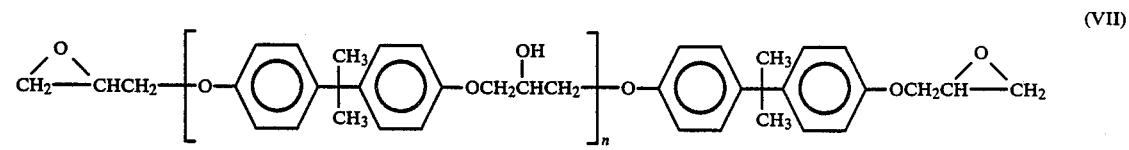

wherein n=0-50, preferably 0-20, especially 0-10, or a diglycidyl ether of bisphenol F of the general formula VIII

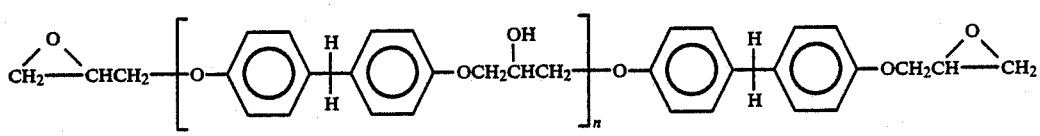

(VIII)

wherein
n=0-50, preferably 0-20, especially 0-10, preferably a mixture of the diglycidyl ether of the formulas VII and VIII, is reacted.

11. The process according to claim 8, characterized in that the glycidyl ether of the formula VI is selected from the group consisting of the triglycidyl ether of glycerine, 1,4-butandioldiglycidylether, neopentylglycol-diglycidyl ether, hexandiol-diglycidyl ether, the diglycidyl ethers of isomeric cyclohexan-dimethanols, ethylenglycol-diglycidyl ether and diethylenglycol-diglycidyl ether.

12. A method of coating a surface comprising by applying the composition according to claim 1 within lacquers, paints and coatings to a steel or concrete surface.

13. The composition according to claim 2 wherein the 1,2-epithiopropyl ether of a polyvalent phenol is a bisphenol A derivable epithiopropyl ether of a general formula III

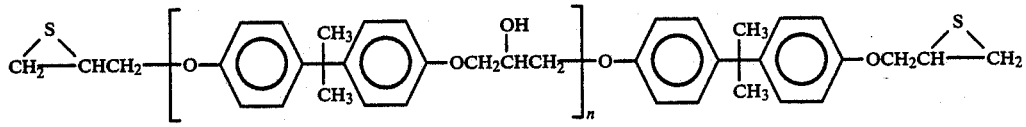

(III)

wherein
n=0-50, or a bisphenol F derivable epithiopropyl ether of the general formula IV

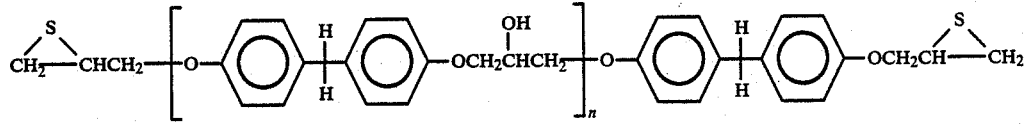

(IV)

wherein
n=0-50, or a mixture of the compounds III and IV in any weight ratio.

14. The composition according to claim 13 wherein n=0-20.

15. The composition according to claim 13 wherein n=0-10.

16. The composition according to claim 10 wherein n=0-20.

17. The composition according to claim 10 wherein n=0-10.

* * * * *